(12) United States Patent
Choi et al.

(10) Patent No.: US 6,258,178 B1
(45) Date of Patent: Jul. 10, 2001

(54) METHOD FOR REMOVING COATED FILM FROM PLASTIC BUMPER OF AUTOMOBILE

(75) Inventors: Hyong Ki Choi; Yong Moo Lee, both of Seoul; John Hee Hong; Yang Soo Lim, both of Ulsan, all of (KR)

(73) Assignees: Hyundai Motor Company, Seoul; Agency for Technology and Standards, MOCIE, Kyoungki-do, both of (KR)

( * ) Notice: Subject to any disclaimer, the term of this patent is extended or adjusted under 35 U.S.C. 154(b) by 0 days.

(21) Appl. No.: 09/431,877

(22) Filed: Nov. 2, 1999

(30) Foreign Application Priority Data

May 19, 1999 (KR) .................................... 99-18022

(51) Int. Cl.⁷ ...................................... B08B 3/00
(52) U.S. Cl. ................... 134/19; 134/15; 134/18; 134/22.1; 134/22.18; 134/23; 134/24; 134/25.1; 134/25.4; 134/25.5; 134/26; 134/30; 134/32; 134/34; 134/35; 134/37; 134/42; 134/95.3; 134/58 R; 134/72; 134/107
(58) Field of Search .................. 134/15, 18, 19, 134/22.1, 22.18, 23, 24, 25.1, 25.4, 25.5, 26, 30, 32, 34, 35, 37, 42, 95.3, 58 R, 72, 107

(56) References Cited

U.S. PATENT DOCUMENTS

| 4,917,042 | * | 4/1990 | Kuronaga et al. ............... 118/72 |
| 5,250,117 | * | 10/1993 | Hirano et al. ..................... 134/1 |
| 5,313,744 | * | 5/1994 | Shank, Jr. ......................... 51/317 |

FOREIGN PATENT DOCUMENTS

| 2278119 | 11/1994 | (GB) . |
| 5009420 | 1/1993 | (JP) . |
| 5084746 | 4/1993 | (JP) . |
| 5093157 | 4/1993 | (JP) . |
| 5115810 | 5/1993 | (JP) . |
| 5115811 | 5/1993 | (JP) . |
| 5220440 | 8/1993 | (JP) . |
| 6099433 | 4/1994 | (JP) . |
| 6107983 | 4/1994 | (JP) . |
| 6285858 | 10/1994 | (JP) . |
| 7108532 | 4/1995 | (JP) . |
| 7164444 | 6/1995 | (JP) . |
| 7256640 | 10/1995 | (JP) . |
| 7256641 | 10/1995 | (JP) . |

* cited by examiner

Primary Examiner—Sharidan Carrillo

(57) ABSTRACT

A heated high pressure air and/or a high pressure water are spouted through nozzles. Therefore, the coated layer is removed without crushing the bumper unlike in the conventional method, and therefore, a plurality of process steps can be skipped. Thus the bulk of the apparatus can be reduced, the operating cost can be lowered, and the environment can be protected. The method for removing a coated layer includes the step of installing a bumper to be subjected to a removal of the coated layer. Then the coated layer is removed from the bumper by spouting water and/or a pre-heated air to the bumper. Then the bumper is carried to a predetermined psition after removing the coated layer, and then the bumper is detached. The apparatus includes an installing/detaching means for installing/detaching the bumper to be subjected to a removal of the coated layer. A spouting device spouts a compressed air to the bumper thus installed to remove the coated layer from the bumper, and an air supplying means and a water supplying means respectively supply air and water to the spouting device. Then a carrying means carries the bumper to a predetermined position after the removal of the coated layer.

5 Claims, 3 Drawing Sheets

6,258,178 B1

METHOD FOR REMOVING COATED FILM FROM PLASTIC BUMPER OF AUTOMOBILE

BACKGROUND OF THE INVENTION

1. Field of the invention

The present invention relates to a method and an apparatus for removing a coated film from the surface of a bumper of an automobile to reuse the bumper. Particularly, the present invention relates to a method and an apparatus for removing a coated film from the surface of a bumper of an automobile, in which a high pressure water or a heated high pressure air is spouted onto the bumper, thereby easily removing the coated film.

2. Description of the Prior Art

Recently, the environmental problems and the resource recycling problems are called to the attention, and regeneration of products is being briskly discussed.

For example, the technique of recycling the defective resin products such as bumpers and side molding products and recycling the resin products of disused cars is recognized as being important.

In many cases, the resin products such as bumpers and side molding products are painted for improving the aesthetic appearance.

For example, the bumper is made of a thermoplastic resin such as a polypropylene resin, and its surface is coated.

The coating is done by using a thermosetting resin selected from a group consisting of amino-polyester resin, amino acrylic resin, polyester urethanic resin, acryl urethanic resin, polyester melanic resin, and acrylmelanic resin. Before the hardening reaction, these resins are in the liquid phase, but when they have gone through the coating process, they have bridge structures.

They have strong and dense structures, and therefore, after the coating, they become anti-chemical, thermally resistant, scratch-resistant, weather resistant, and shiny.

For example, in most vehicles, the base stock of the bumper is 2.5–5 mm-thick, and thereon, a coating of 15–30 microns is done by using polyester urethanic resin, this being the general practice.

In another method, the base stock is a thermoplastic resin, and thereon, an inorganic compound is coated.

When recycling such a coated bumper, if the bumper is crushed without removing the coated layer so as to form into pellets, then the coated layer material is mixed into the polypropylenic resin of the bumper base stock material. In this state, if the polypropylenic resin is molded, the coated layer material impedes the fluidizing of the melted resin, or forms bubbles and weld marks, thereby causing molding defects. Further, the aesthetics of the bumper is aggravated.

Further, there is no melting compatibility between the base resin and the coated layer material, and therefore, the homogeneity lacks, with the result that the mechanical strength of the bumper material is aggravated.

Accordingly, if a bumper is to be recycled, the removal of the coated layer has to be necessarily preceded.

The conventional coated layer removing method includes mechanical methods and chemical methods. First the mechanical methods will be briefly described.

Japanese Patent 95-164444 (entitled "METHOD AND APPARATUS FOR RECOVERING AND ASSEMBLING WASTE MOLDING PRODUCTS") discloses the following technique. That is, a coated resin molding product is crushed into small pieces, and they are ground by using a surface grinder so as to peel off the coated layer. Then a compression impact force and an impact abrasion force are applied to detach the peeled coated layer. This method is a vibration-compression method, and is known to be very effective in this field.

However, in this method, the treating process is very complicated, to such a degree that the whole process consists of 6–8 steps. Depending on the kind of the coated resin products, the whole process has to be repeated for several times, and in spite of this, only 90% of the coated layer can be removed. Therefore, the required time period is very much extended. Further, the coated layer peeling facility requires a large installation area, and the process steps have to be repeated, with the result that the operating cost is increased.

As another mechanical peeling method, there is British Patent 94-2278119A (entitled "RECYCLING OF RESIN COMPOSITIONS"). In this method, a coated resin molded product is crushed and extruded, and extended by using a roll. Then a recrushing is carried out.

This method has the advantage that the process is relatively simple. However, the extruded sheet is mixed with the pieces of the coated layer, and the peeling efficiency is also low.

As similar techniques, there are Japanese Patent 95-256640 and 95-256641. In these techniques, only a rolling is carried out to extend the coated resin product, thereby peeling the coated layer. However, this technique is not suitable for products of complicated contours such as the bumpers of automobiles.

In another mechanical method, tiny grinding particles are spouted loaded in a compressed air to remove the coated layer, this being a shot-blast method. In this method, the frictions and impacts are utilized to remove the coated layer, and therefore, the non-toxicity and the environmental stability are its merits. However, the treating time is extended, and the removal efficiency is not sufficient.

In another mechanical coated layer peeling method, the resin product is crushed to fine particles and is heated to melt it. Then the melt is filtered by using a sieve, thereby the coated layer pieces being removed, this being a screen mesh method. In this method, the non-toxicity and the environmental stability are its merits, but the screen meshes are frequently clogged. Therefore, there is the disadvantage that the screen mesh has to be replaced very frequently, thereby lowering the productivity.

Now the chemical coated layer peeling methods will be described. These chemical methods are effective in removing the coated layer in the curved and depressed portions, but in these methods, a secondary treatment such as the treatment of waste water is accompanied. Further, the overall treating efficiency is low.

To describe them specifically, Japanese patent 93-93157 (entitled "COATED LAYER PEELING METHOD, AND POST TREATMENT"), 93-9420, and 93-9419 are known to be most effective among the chemical methods. In these methods, the coated layer is removed by using a mixture of a biprotonic solution, alcohol, and a metal or quarterly ammonium thio-cyanate. In this method, the ether bonds near the bridge point of the coated resin is cut by using an organic salt, thereby decomposing the coated layer material.

However, this method uses halogenic organic solvents such as chloro-penta-fluoro-propane, methylene chloride, chloroform, and tetra-carbon chloride. These solvents are likely to destroy the ozone layer, and may be harmful to the workers. Therefore it is proposed that these halogenic organic solvents be substituted with other chemical materials.

However, even if the toxicity to the human health and the environmental pollution are slightly improved by the substitution, the danger remains all the same. Further, in peeling the coated layer, the peeling process and the filtering process are very much complicated, and the mixing ratio of the chemicals has to be adjusted very often. Further, an auxiliary facility is required to recover and purify the chemicals to recycle them. These are the major problems of this method.

Another chemical method is disclosed in Japanese Patent 93-115810 (entitled "METHOD FOR REGENERATING COATED PROPYLENE RESIN BUMPER"), and Japanese Patent 93-115811. In these methods, the resin product is crushed, and then, surfactants such as a fatty acid slat, fatty acid sugar ester, fatty acid sorbitan ester, alkyl benzene sulfonate and the like are added to peel off the coated layer.

In this technique, the toxicity to the human health and the harm to the environment are low, but the secondary treatment has to be gone through, in addition to the fact that the treatment efficiency is low.

As another chemical method, there are Japanese Patents 94-107983 and 93-220440 (in which aqueous alkaline solution is used, and heating is carried out to a high temperature), Japanese Patent 94-99433 (in which alcohol, water, amine or azoles are used), and Japanese Patent 93-84746 (in which methylene chloride and water are used). In these methods, a post treatment is required, and therefore, the facility cost and the time extension are excessive. Further, the efficiency is low, and the toxicity to the human body and the environmental safety are problematic.

As another chemical method, there are Japanese Patents 95-108532 and 94-285858 in which the chemicals are replaced with water so as to carry out hydrolysis.

In this hydrolysis method, the toxicity and the environmental contamination can be solved. However, if the treatment time is to be shortened, and if the peeling efficiency is to be improved, acid, alkali or alcohol has to be added. If chemicals are not used, the treatment time is extended. Further, if the peeling efficiency is to be improved, a high temperature and a high pressure have to be applied.

To review the above described mechanical and chemical methods, the mechanical methods such as shot-blast method and the vibration compression method lack economy, and are not suitable for products of complicated contours.

In the mechanical methods, too many process steps are required, the treatment time is long, and the peeling efficiency is low, although they have merits such as a low environmental pollution and a low cost.

The chemical methods include the hydrolysis method, the alkali dissolving method, and the organic salt method, which have been put the practical use. In these methods, however, the organic solvents have to be heated up to the boiling points, and therefore, the process becomes unstable, while the costs for the recovering facility and the post treatment are excessive.

Further, the workers may be exposed to the toxicity, and the environment may be contaminated.

Currently, the automobile makers are trying to combine the advantages of the mechanical and chemical methods, but no tangible result has been reaped so far.

In the conventional methods as described above, the coated layer can be peeled off only after crushing the coated bumper, and therefore, the peeling efficiency is low. Further, the bulk of the peeling facility is large, and therefore, the installation area becomes large, as well as requiring a high operating cost.

Further, after the completion of the peeling process, the coated layer pieces still remain, and therefore, a complicated secondary treatment process such as filtering and water discharging is required. Due to this secondary treatment process, the treatment time and the treatment cost become excessive, thereby causing a problem.

Meanwhile, in the chemical methods, the problems are the toxicity to the human body and the environmental contamination.

SUMMARY OF THE INVENTION

The present invention is intended to overcome the described disadvantages of the conventional techniques.

Therefore it is an object of the present invention to provide a method and an apparatus for removing the coated layer of a bumper of an automobile, in which the coated layer is removed without crushing the bumper unlike in the conventional method, and therefore, a plurality of process steps can be skipped. Thus the bulk of the apparatus can be reduced, the operating cost can be lowered, and the environment can be protected.

In achieving the above object, the method for removing a coated layer from a coated resin product according to the present invention includes the steps of: installing a bumper to be subjected to a removal of the coated layer; removing the coated layer from the bumper by spouting water or a pre-heated air to the bumper; carrying the bumper to a predetermined position after removing the coated layer; and detaching the bumper.

In another aspect of the present invention, the method for removing a coated layer from the coated resin product according to the present invention further includes the pre-treatment step of pre-heating or applying thermal impacts or cooling so as to easily remove the coated layer.

In still another object of the present invention, the apparatus for removing a coated layer from a coated resin product according to the present invention includes: an installing/detaching means for installing/detaching a bumper to be subjected to a removal of the coated layer; a spouting device for spouting a compressed air to the bumper thus installed to remove the coated layer from the bumper; an air supplying means and a water supplying means for respectively supplying air and water to the spouting device; and a carrying means for carrying the bumper to a predetermined position after a removal of the coated layer.

The installing/detaching means for selectively installing and detaching the bumper includes: a mold 205 for supporting the bumper; a vacuum-sucking pad 203 for vacuum-securing the bumper, in a state with the bumper supported by the mold 205; a turn-table 206 for turning the bumper (supported by the mold 205) within an angular range to eliminate a dead area of a spouting angle when spouting water and air; a step motor 208 for controlling a turning angle of the turn table 206; and a stopper 202 for limiting an installation position of the bumper (supported by the mold 205).

Further, there can be adopted an automatic carrying method in which the bumper supported by the mold 205 is vacuum-secured to realize a continuous process. Further, the vacuum-sucking pad 203 vacuum-secures the bumper to ease the removal of the coated layer by means of robots A1–A3, and B1–B3. Nozzles are attached to the robots to efficiently carry out the removal of the coated layer.

In the above constitution, the spouting device may be a 6-axis vertical multi-joint robot with nozzles installed thereon. The robot memorizes the shape of the bumper in the form of a coordinate, and moves along the memorized coordinate (the curvature, the moving velocity, the contact angle between the nozzle and the bumper). Further, the robot maintains a constant distance to the bumper, and thus, peels off the coated layer in an automatic continuous manner.

In the above constitution, the high pressure air supplying means includes: a compressor 105 for compressing the air; an air tank 106 connected to the compressor 105, for storing the compressed air; and a pre-heating device 107 connected to the air tank 106, and having a pre-heater so as to supply a high pressure air (with a predetermined temperature) to the spouting device. The high pressure water supplying means includes: water tanks 101$a$1–101$a$3 for storing water; high pressure pumps 102$a$1–102$a$3 for supplying the water from the water tanks to the spouting device; a filtering device 108 for filtering the high pressure water of the spouting device to recycle it to the water tanks; and a device for maintaining the water of the water tanks at a constant temperature.

The carrying means for continuously carrying the bumpers includes a carrying pad 207. A free follower conveyor connecting pad is provided in the form of a sliding conveyor, so that the carrying pad 207 can horizontally move. Thus, the carrying pad 207 moves along a guide rail 201, while a turn table 206 and a lifter 209 are installed to rotate and vertically move the carrying pad 207. In order to fix the position of the carrying pad 207, there is installed a stopper 202. Thus if the stopper 202 is activated, then the turn table 206 can be moved so as to be maintained vertically and horizontally, and so as to be inter-lockingly activated with the robot. Thus the means which are disposed at front, rear, left and right are activated to fix the position, thereby making the robot operate in an interlocking manner.

The carrying pad 207 on which the bumper 204 is loaded operates continuously over the free follower conveyor, and in order to more efficiently handle, a mold-exclusive robot may be installed.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE INVENTION

The resin product to be subjected to the removal of the coating in the present invention will be an automobile bumper. Based on this assumption, descriptions will be made throughout this specification.

Figure 1:
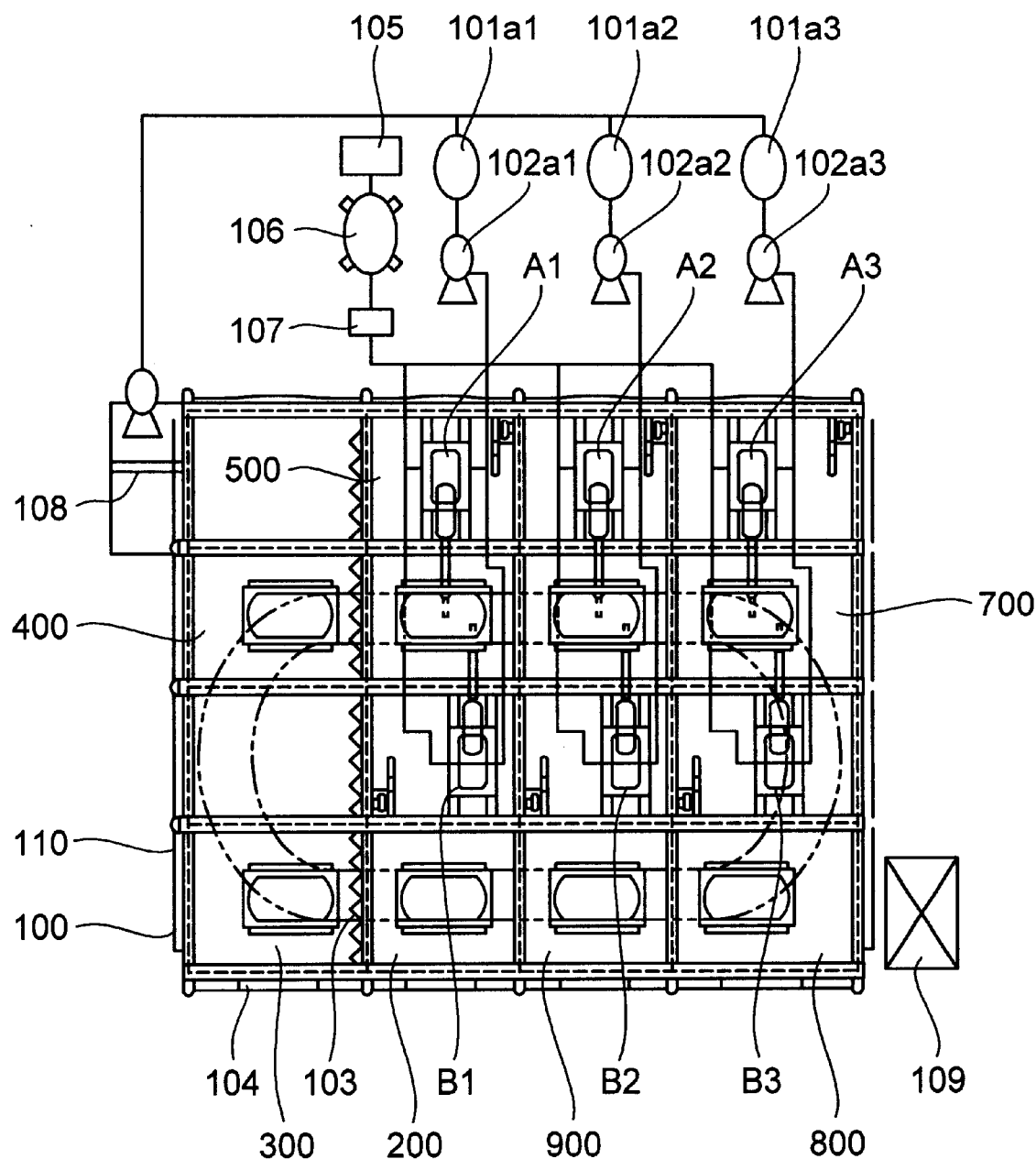
FIG. 1 is a schematic plan view of the coated layer removing apparatus according to the present invention.

FIG. 1 is a schematic plan view of the coated layer removing apparatus according to the present invention.

Referring to this drawing, there are provided a plurality of compartments 300 and 400 in which pre-treatments such as cold/hot shocking and cold/hot dipping are carried out on the surface of the bumper.

The carrying pad 207 with a bumper loaded thereon is carried by a free follower conveyor, and the kind of the bumper is bar-encoded into robots.

The coated layers of the bumpers which have been bar-encoded into the robots A1–A3 can be peeled off by the robots. Further, another set of robots B1–B3 are installed relating to the robots A1–A3, so that they can carry out the removal of the coated layers of the bumpers.

The apparatus for removing a coated layer from a coated resin product according to the present invention includes: an installing/detaching means for installing/detaching a bumper to be subjected to the removal of the coated layer; a carrying means for carrying the bumper to a predetermined position; a spouting device for spouting a compressed air or water to the bumper to remove the coated layer from the bumper; and an air supplying means and a water supplying means for respectively supplying air and water to the spouting device.

As shown in the drawing, the bumper to be subjected to the removal of the coated layer is loaded on a mold (which is mounted on a carrying pad) within a first compartment 200. Then the bumper is carried to a second compartment 300 and to the third compartment 400 to undergo pre-treatments. Then the bumper is carried to fourth, fifth and sixth compartments 500, 600 and 700 to undergo the coated layer removal process. After the removal of the coated layer, the bumper is carried to a seventh compartment 800 to undergo a finish treatment, and then, the bumper is carried to an eighth compartment 900 to be detached from the carrying pad.

Figure 2:
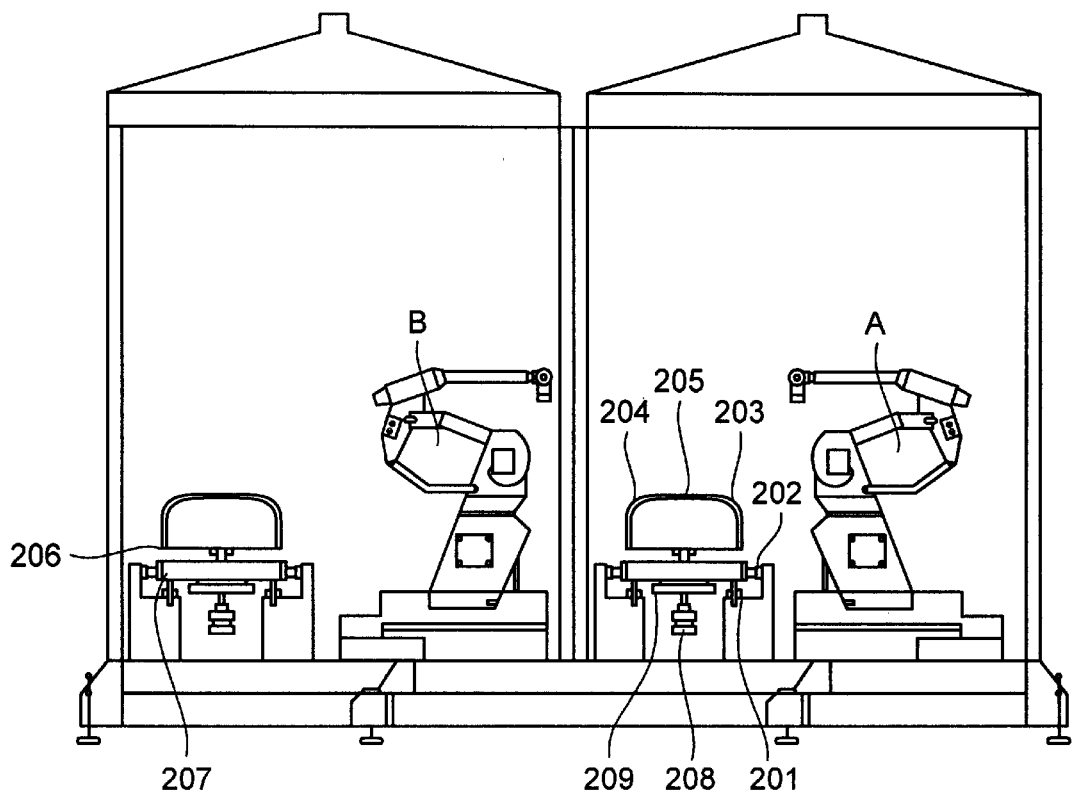
FIG. 2 is a schematic side view of the coated layer removing apparatus according to the present invention.

As shown in FIGS. 1 and 2, if more pre-treatments are required depending the cases, then an additional compartment should be preferably provided.

Between the pre-treating compartment and the coated layer removing compartment, there is installed an air curtain 103 to block the transmission of heat.

On each of the compartments, a see-through window 110 is formed, so that the interior can be observed. Further, in each of them, a lifter 209 and a step motor 208 are installed, so that the installation and detachment of the bumper can be carried out, thereby making it possible to speedily carry out the operation.

In the case where the see-through windows 110 are installed, they should be such that the operations of the robots will not be interfered. Except the front face of the compartment, the side faces of the compartment should preferably take the form of drawings.

As shown in FIGS. 1 and 2, in each of the compartments 200–900, there is installed a mold 205 so as to load one of the bumpers 204. On the outside of the mold 205, there is installed a vacuum-sucking pad 203 to vacuum-securing the inside of the bumper 204. Thus the bumper 204 is firmly supported by the mold 205, because the vacuum-sucking pad 203 firmly vacuum-sucks the bumper 204.

The contour of the mold 205 should be such that it should be fit to the inside of the bumper. For this purpose, the mold 205 should be preferably made of a thermosetting resin such as unsaturated polyester resin, or epoxy resin reinforced with glass fibers.

Further, in the case where the paint on the inside of the bumper is to be removed, the robots B are utilized to set the bumper upside down. In this case also, the vacuum sucking means can be used.

When removing the coated layer by using a high pressure water or a high pressure air, a dead area can be formed in the spouting angle. Therefore, the bumper has to be arbitrarily rotated to eliminate the dead area. That is, such a means has to be provided.

For this purpose, there is provided a turn table 206 which can arbitrarily rotate the mold 205 (with the bumper loaded thereon) within a certain angular range. The rotation of this turn table 206 is properly controlled by means of air.

That is, the turn table 206 is capable of turning the mold 205 by +−180 degrees, and therefore, the coated layer of the dead area can be removed, which cannot be reached by the 6-axis vertical multi-joint robots A1–A3 and B1–B3, which will be described below.

Figure 3:
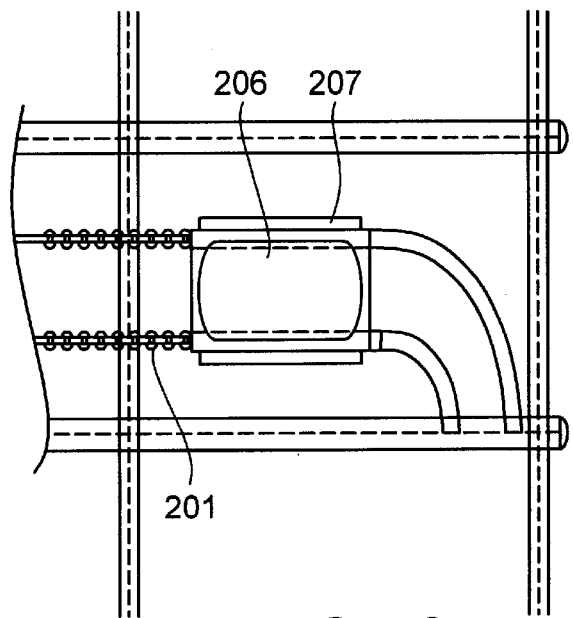
FIG. 3 is a plan view of the bumper carrying device of the coated layer removing apparatus according to the present invention.
Figure 4:
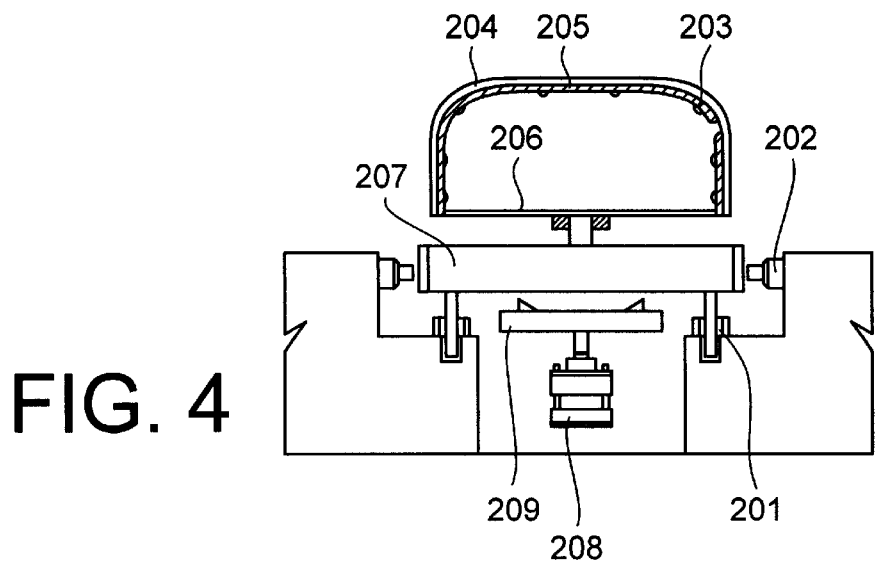
FIG. 4 is a side view of FIG. 3.

As shown in FIGS. 2 to 4, the bumper is loaded on the mold 205 (on the carrying pad 207) within the first compartment 200. Then the bumper, the mold and the carrying pad are made to undergo a pretreatment. Then the bumper is carried to the compartments 500, 600 and 700 where the robots are installed to carry out the coated layer removal.

For the purpose of carrying, a free follower conveyor is installed over the entire distance between the first compartment 200 to the eighth compartment 900. Along this free follower conveyor, the carrying pad 207 moves.

Stoppers 202 are formed on the sides of the carrying pads 207 to accurately position the bumpers at the precise predetermined positions. The bumper thus carried stops by the stopper at the precise position where the robots initiates the operation.

When the carrying pad 207 moves, it is guided by a guide rail 201.

Thus if the bumper which is loaded on the mold is positioned at the initial robot operation position, then a high pressure water or a heated high pressure air is spouted, so as to remove the coated layer of the bumper.

The removal of the coated layer is carried out by the robots A1–A3 which are installed on a side of a frame 100 to carry out the spouting. Nozzles 310 are installed on the ends of the robots to spout the high pressure water and the heated high pressure air.

The angle of the nozzle 310 relative to the bumper 204 should be preferably 20–60 degrees, and more preferably 30–40 degrees.

The robots A1–A3 memorize the shape of the bumper 204 in the form of a coordinate, and moves according to the memorized coordinate. Thus the nozzle of the robot can maintain a constant distance from the bumper all the time, and therefore, a uniform peeling operation can be carried out.

As shown in FIG. 1, the high pressure air supplying means includes: a compressor 105 for compressing the air; an air tank 106 connected to the compressor 105, for storing the compressed air; and a pre-heating device 107 connected to the air tank 106, and having a pre-heater so as to supply a high pressure air (with a predetermined temperature) to the spouting device.

The high pressure water supplying means includes: water tanks 101a1–101a3 for storing the water; high pressure pumps 102a1–102a3 for supplying the water from the water tanks to the spouting device; and a filtering device 108 for filtering the high pressure water of the spouting device to recycle it to the water tanks 101a–101a3.

When removing the coated layer of the bumper by means of the high pressure air, electrostatic charges are generated owing to the frictions between the spouted air and the surface of the bumper. Owing to these electrostatic charges, the peeled coated layer can be re-attached, and in order to prevent this phenomenon, the high pressure water is combinedly used.

In the case where the high pressure water is combinedly used, the peeling time is shortened, and the residual coated layers can also be neatly removed.

Upon completion of the removal of the coated layer in the seventh and eighth compartments 800 and 900, the bumper is moved to undergo a finish step and a detaching step.

Figure 5A:
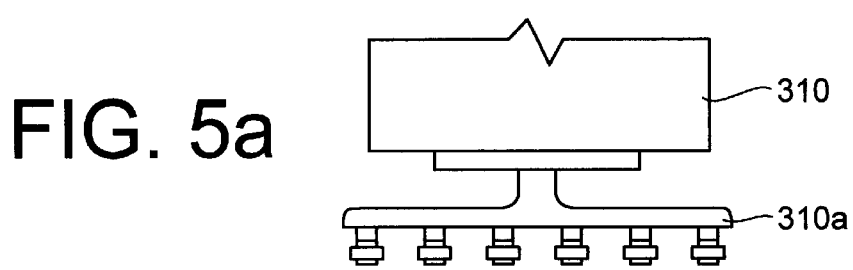
FIG. 5$a$, 5$b$ and 5$c$ illustrate the nozzles of the coated layer removing apparatus according to the present invention.
Figure 5B:
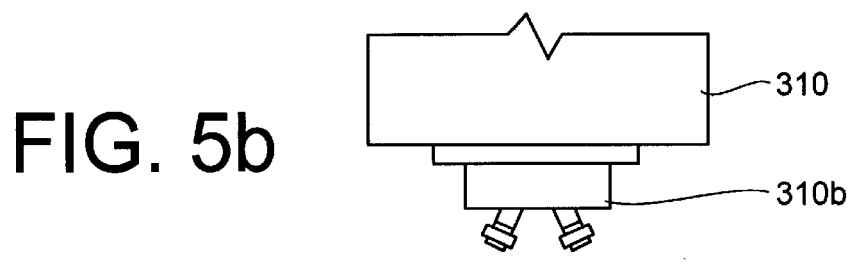
Figure 5C:
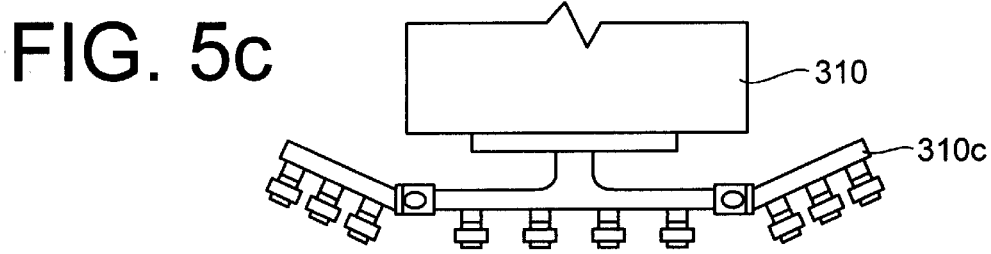

Meanwhile, FIG. 5 illustrates the nozzles of the coated layer removing apparatus according to the present invention.

As shown in FIG. 5, one of the nozzles 310 is attached on each of the robots, the nozzles being suitable for peeling the coated layer of the bumper.

Even in the case where the bumper has a complicated shape such as flat portions, curved portions, irregularly depressed and projected portions, corner portions and the like, there can be selected a proper nozzle arrangement to effectively carry out the peeling of the coated layer.

In the present invention, a plurality of nozzles 310 is required, so that the peeling efficiency can be promoted in accordance with the shape and characteristics of the bumper.

Thus in FIG. 5, there are shown a straight nozzle arrangement 310a, a V shaped nozzle arrangement 310b, and a side ascending nozzle arrangement 310c.

Actually, the shapes of the bumpers of automobiles are diversified. Therefore, the straight nozzle arrangement can peel off the middle portion of the bumper, and the V shaped nozzle arrangement can peel off the coated layer of the curved portions, while the side ascending nozzle arrangement can peel off a gently recessed portion.

If these three kinds of the nozzle arrangements 310a, 310b and 310c are applied to the removal of the coated layer of the bumper, then three or more robots A1–A3 and B1–B3 have to be installed for each process. Further, the respective compartments should be such that they should be suitable for continuous operations.

Now the present invention will be described as to its coated layer removing method and its effects.

First, a bumper is loaded on the mold having a shape same as that of the bumper. Thus the vacuum-sucking pad vacuum-secures the bumper, and the carrying pad thus loaded with the bumper is carried to the pre-treating step.

The carrying is done through the free follower conveyor, and the carrying pad can be rotated by the turn table.

When the bumper is carried to the robot, the stopper fixes the bumper horizontally, and the lifter fixes the bumper vertically. From this point, the peeling of the coated layer is started.

As described above, the shape of the bumper is bar-encoded and stored in advance, while the curvature, moving velocity, the contact angle between the nozzles and the bumper, and the robot moving manner are also inputted in advance.

At the initial time when the robots A1–A3 start the peeling operation, a heated high pressure air is spouted onto the surface of the bumper 204. Under this condition, it is important to properly adjust the contact angle between the surface of the bumper 204 and the nozzles 310.

For example, the contact angle between the surface of the bumper 204 and the nozzle 310 may be 20–60 degrees. However, this angle should be properly selected by considering the spouted substance and the kind of the coated layer.

The operating velocity of the robots should be preferably 40–1,000 mm/sec, and more preferably 120–400 mm/sec.

Even during the movement of the robots, the contact angle between the bumper and the nozzle 310 should be maintained constant.

Depending on the shape of the bumper 204, the nozzle arrangement 310 may be replaced, and a plurality of the nozzle arrangements 310 can be simultaneously employed to peel off different portions of the bumper.

The shape of the bumper is different depending on the kind of car, and depending on the installation portion. Therefore, in actual, a plurality of robots can be used to shorten the peeling time and to improve the productivity.

In the preferred embodiment of the present invention, first the heated high pressure air is spouted to primarily peel off the coated layer, and then, in order to prevent the re-attachment of the peeled coated layer due to the generation of electrostatic charges, a high pressure water is spouted. However, without using the heated high pressure air, only the high pressure water can be used.

In the case where the high pressure water is used, the pressure should be preferably 100–200 Kgf/square cm, and more preferably 150–190 Kgf/square cm, while the temperature should be preferably 10–90 degrees C. and more preferably 20–40 degrees C.

The coated layer pieces which have been removed by the high pressure water are filtered off. The water after the filtering is sent by a high pressure pump to the water tank to be recycled.

Meanwhile, if a dead area is formed during the spouting, a control section 109 detects it. Then the control section 109 supplies a power to the step motor 208 to turn the turn table 206 to a required angle, thereby eliminating the dead area.

The nozzles which spout the high pressure air or the high pressure water operate inter-lockingly with the robots, and this interlocking is controlled by the control section 109.

The nozzles 310 which spout the heated high pressure air should be made of a heat resistant material. The temperature of the heated high pressure air should be preferably 60–170 degrees C. and more preferably 90–110 degrees C. The spouting pressure should be preferably 5–20 Kgf/square cm, and more preferably 7–12 Kgf/square cm.

In the present invention, if the high pressure air is spouted while keeping a constant angle between the nozzles 310 and the surface of the bumper 204, then the coated layer is peeled off. The peeled coated layer pieces are sucked into a suction hole which is formed in front of the nozzle, and therefore, any flying of the pieces can be prevented.

However, a part of flown pieces can be attached back to the bumper, and in order to prevent this phenomenon, the high pressure water is spouted, thereby inhibiting the generation of electrostatic charges and removing the re-attached pieces.

In another method of preventing the re-attachment of the peeled pieces, the high pressure air and the high pressure water are simultaneously spouted.

The conditions of spouting the high pressure water and the pre-heated high pressure air are inputted into the control section 109 in advance. Further, the starting point and the ending point are also inputted into the control section 109.

After completely removing the coated layer from the bumper 204, the bumper 204 is carried loaded on the carrying device. Then the bumper 204 is detached from the mold 205 by injecting air into the suction pad 203, thereby terminating the coated layer peeling operation.

One of the major features in the present invention is that the coated layer is peeled off without crushing the bumper itself, and therefore, the bumper can be recycled as it is, by only coating the bumper.

That is, in all of the prior art, the bumper is crushed in advance, and then, the mechanical or chemical method is applied to remove the coated layer pieces. Then the remaining resin is re-molded into a bumper. Therefore, a crushing process and a fabricating process are additionally required.

In contrast to this, in the present invention, a series of the conventional processes are skipped, and therefore the process steps can be simplified to a significant degree. Further, the degradation of the material during the re-fabrication can be avoided.

The surface roughness of the bumper after the peeling becomes an important factor for the re-coating, and therefore, the peeling medium should be carefully spouted.

That is, in the conventional methods in which the bumper is crushed and is re-fabricated, the surface roughness can be disregarded. However, in the present invention in which the bumper itself is not crushed but is used as it is only by re-coating, the surface roughness gives a great influence to the re-coating.

After the peeling of the coated layer according to the present invention, the surface roughness was measured. The measured surface roughness was found to be 0.30 microns, and this will not give any problem during the coating. Even in the case where the surface roughness is coarse, this owes to the residual primer layer which has been used to promote the adhesion between the top coat and the bumper itself. Therefore, the re-coating will not be much affected.

TABLE 1

| Peeling means | Condition P (Kgf/Cm²) | T(° C.) | Peeling state | adhesion | QUV | property |
|---|---|---|---|---|---|---|
| Cold water | over 190 | 20 | Δ Bumper is damaged due to pressure, particularly on the edge and bolt portions. | — | — | — |
|  | 130–190 | 20 | ⊙ Curved portion of bumper is not damaged by controlling velocity. | ⊙ | ⊙ | ⊙ |
|  | 100–130 | 20 | X Pressure is too low. |  |  |  |
|  | 150–190 | below 10 (winter) | ○ Winter season affects the water temperature. Peeling width is narrow. Adjustment of velocity is required. | — | — | — |
| Hot water | 110–130 | 70–90 | ○ With hot water, velocity increases, the surface roughness is low, and the peeling width is wide to improve the efficiency. But with the current | — | — | — |

TABLE 1-continued

| Peeling means | P (Kgf/Cm²) | T(°C.) | Peeling state | adhesion | QUV | property |
|---|---|---|---|---|---|---|
| | | | conditions, the roughness is bad. | | | |
| | | 60–70 | ◎ Roughness is superior. | ◎ | ◎ | ◎ |
| | | 40–60 | ○ Roughness is bad relatively. | — | — | — |
| | 130–190 | 70–90 | ○ Roughness is bad relatively. | — | — | — |
| | | 60–70 | ○ Roughness is bad relatively | — | — | — |
| | | 40–60 | ◎ Roughness is superior. | ◎ | ◎ | ◎ |
| | below 110 | 30 | X Peeling is not done due to low pressure. | — | — | — |
| | | 40 | X Peeling is not done due to low pressure. | — | — | — |
| Air | 7–12 | 90–110 | ◎ Peeling efficiency is maximum, when discharge pressure and heater capacity are adjusted. | ◎ | ◎ | ◎ |
| | | 120–130 | X Melting occurs due to degradation of bumper. | — | — | — |
| | below 7 | 90–110 | Δ Thermal damages occur (with pressure of 7. Peeling efficiency is lowered according to capacity of heater. | — | — | — |
| | above 15 | 90–110 | X Peeling efficiency is lowed according to capacity of heater. | — | — | — |

\* ◎: superior, Δ: good, x: bad and x: terrible
- condition: distance; 50 mm, the spouting angle; 45–35°, the moving velocity; different between water and air.

Table 1 shows the peeled status and the re-coatability which were measured after carrying out the peeling according to the present invention.

As described above, the present invention uses only water and air in peeling the coated layer from a bumper, and therefore, the method is not harmful to both the environment and the human body. Further, the bumper is not crushed but is kept intact, and only the coated layer is peeled off. Therefore, the process steps are simplified, and therefore, the cost is lowered.

According to the present invention as described above, the bumper is not crushed but is kept intact, and only the coated layer is peeled off. Therefore, the re-fabrication of the product is skipped, and therefore, a re-coating can be done directly on the peeled bumper. Accordingly, the economy is improved, and the process steps are simplified.

Further, only water and air are used to peel off the coated layer, and therefore, the method of the present invention is environment-philic more than any of the conventional mechanical and chemical methods. Further, the energy saving effect is significant, and the operating cost can be curtailed, as well as ensuring the safety to the human health.

Further, since only water and air are used as the peeling medium, a post treatment is not required, and the used air is not polluted, while the used water can be totally recovered to reuse it. Therefore, the environment is not harmed at all.

What is claimed is:

1. A method, for removing a coated layer from a bumper, comprising:
    removing said coated layer from said bumper by applying a fluid stream consisting essentially of pre-heated pressurized air to said bumper without crushing said bumper;
    wherein electrostatic charge on said bumper is generated by said pre-heated pressurized air being applied to said bumper, said electrostatic charge promoting the reattachment of pieces of said coated layer to said bumper; and
    preventing electrostatic reattachment of said pieces of said coated layer to said bumper by applying pressurized water to said bumper.

2. The method as claimed in claim 1, wherein said pressurized water has a pressure in a range of 100–200 Kgf/square cm, and a temperature in a range of 10–90° C.

3. The method as claimed in claim 1, wherein said pre-heated pressurized air has a temperature in a range of 60–170° C., and a pressure in a range of 5–20 Kgf/cm².

4. The method as claimed in claim 1, further comprising applying at least one pre-treatment to said bumper before said step of removing.

5. The method as claimed in claim 1, further comprising carrying out at least one post treatment of said bumper after said step of preventing.

\* \* \* \* \*